Dec. 26, 1944.
L. F. BENTLEY
2,365,998
METHOD OF AND APPARATUS FOR HEATING MATERIAL TO
PERFORM MACHINING OPERATONS THEREON
Filed Oct. 5, 1942
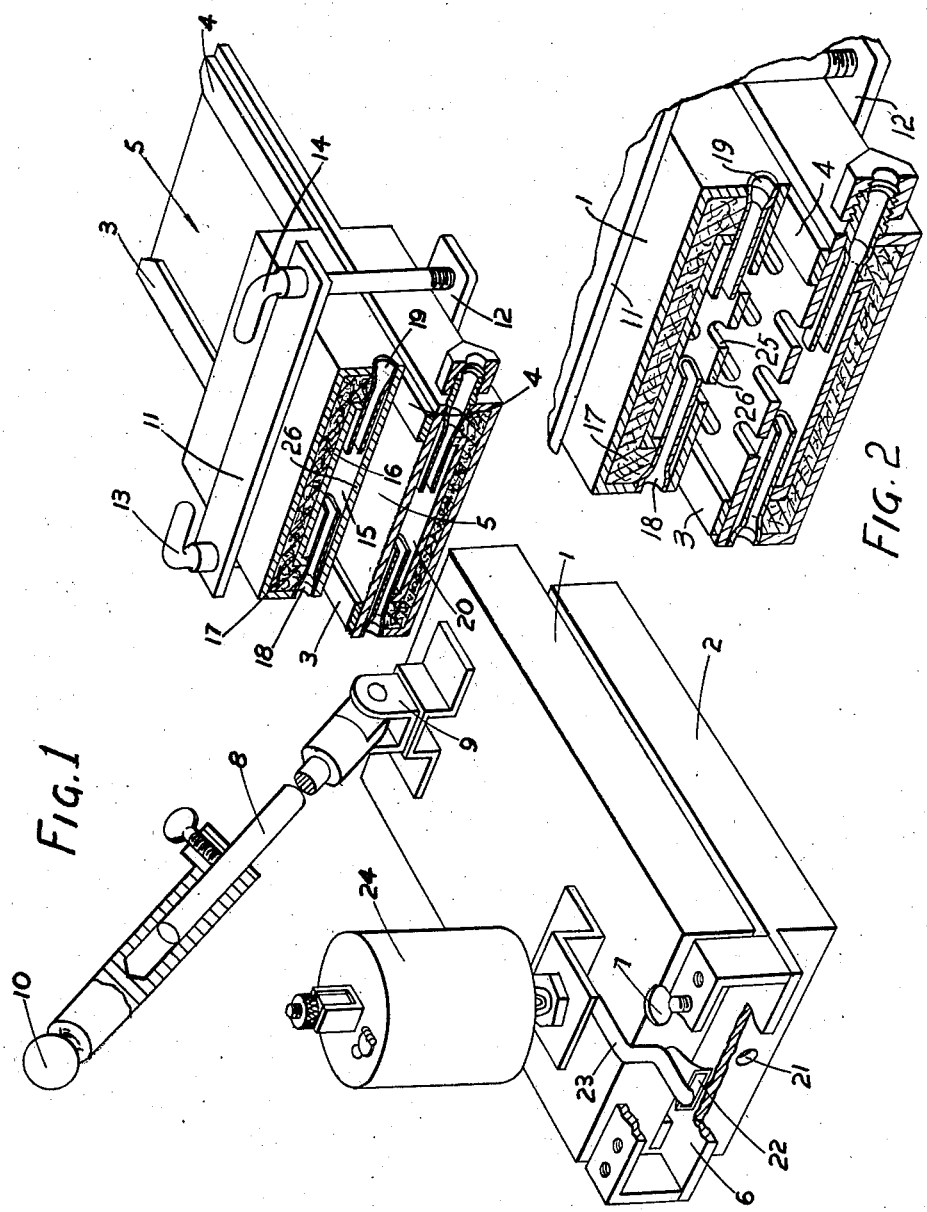
INVENTOR
L.F. BENTLEY
BY
ATTORNEYS Patented Dec. 26, 1944

2,365,998

UNITED STATES PATENT OFFICE 2,365,998

METHOD OF AND APPARATUS FOR HEATING MATERIAL TO PERFORM MACHINING OPERATIONS THEREON

Leslie Firth Bentley, Cambridge, England, assignor to Pye Limited, Cambridge, England, a British company Application October 5, 1942, Serial No. 460,926
In Great Britain March 6, 1942

13 Claims. (Cl. 164—125)

The present invention relates to the machining of synthetic resin varnished paper boards and other materials which are unable to withstand punching, shearing and like machining operations at normal workshop temperature on account of inherent brittleness of the material, but capable of being made to withstand these operations by raising the temperature of the material to a point at which the brittleness is reduced to a sufficient degree. These materials, when cut into sheets and strips of the correct dimensions for feeding into the machine will be referred to hereinafter as the stock.

It is the usual practice to carry out the heating operation referred to above by laying the stock on a hot plate, which not only results in uneven heating of the stock but the stock also becomes progressively cooled as it is being fed into the machine, whereby either the same sheet will have to be heated more than once or else its initial temperature must be raised higher than the necessary punching temperature, whereby deterioration may be caused to the material, as for instance by scorching and splitting. Another method commonly adopted for this purpose, viz., the immersion of the stock in an oil bath, enables it to be readily heated to a relatively uniform temperature but suffers from the same drawback as noted previously that the temperature falls progressively as the machining operation proceeds.

According to the present invention the temperature of the stock is raised, or maintained at the temperature to which it has been pre-heated, as it approaches the machining operation, for example, a press tool, so that at the instant of punching or shearing its temperature has reached or is still maintained at the required value for the machining operation.

A feature of the invention consists in raising the temperature of the surface of the tool which come into contact with the stock to approximately the temperature required for the machining operation, whereby the temperature of the stock is relatively free from variation immediately before and during the machining operation.

A further feature of the invention consists in the use of a hot air blast to provide the necessary heating, whereby the finished piece from the tool and the surfaces of the tool itself may be blown free of swarf, thus saving a further cleaning operation and increasing the service life of the tool. The air blast may also be used for supplying oil or other lubricant to the tool in controlled quantities.

Another feature of the invention consists in an attachment for a machine tool which enables an existing machine tool to be readily modified and adapted for carrying out the process according to this invention.

The attachment may be in the form of a feeding channel or guide for the stock for heating the stock passing therethrough. The channel or guide may be heated by hot air which exhausts on to the tool so as to heat the surface of the tool and blow swarf and chips away therefrom. The exhaust air may also blow atomised oil on to the tool.

In order that the invention may be more clearly understood, an embodiment thereof will now be described by way of example with reference to the accompanying drawing in which Fig. 1 shows a perspective view, partly in section, of an attachment for a power press, and Fig. 2 shows a fragmentary sectional view of a modification.

Referring to Fig. 1 of the drawing, the attachment comprises a pair of upper and lower heaters 1 and 2 which are spaced apart by means of spacing guides 3 and 4 so as to form a channel or guide 5 therebetween through which the stock in the form of a flat strip is fed. The attachment is secured to the power press by means of the bracket 6 equipped with winged screws 7 for securing the front end of the attachment to the tool guides in such a position that the stock emerging from the guide 5 passes through the tool guides and beneath the press tool. The attachment extends from the power press and is supported in the desired position by means of the telescopic adjustable arm 8 which is fulcrumed at one end to a bracket 9 secured to the upper heater 1 and is attached by a ball joint 10 to a bracket (not shown) secured to a suitable point on the power press.

The upper and lower heaters are secured together at two or more places along their length by adjustable clamps each comprising a pair of strips 11 and 12 which are longer than the width of the heaters and are clamped together at their overhanging parts by means of the clamping screws 13, 14 which pass through apertures in the ends of the upper strip 11 and screw into threaded apertures in the ends of the lower strip 12. Only one of such adjustable clamps is shown in the drawing but at least two and preferably three are provided at suitable positions along the length of the attachment. By loosening the clamping screws 13, 14, the adjustable spacing guides may be adjusted between the heaters to the width of the stock to be fed and secured in the adjusted position by tightening the clamping screws.

The upper and lower heaters are of substantially identical construction, and therefore, only the construction of the upper heater 1 will be described. It comprises a box-like metallic casing 1 having a hot air chamber 15 formed therein by the box-like wall 16. The space between the wall 16 and the surface 26 of the box 1 which lies adjacent the channel 5 forms the hot air chamber 15 and the remaining space in the box 1 is filled with heat insulating material 17, such as silica wool packing. Hot air is admitted to the hot air chamber 15 through either the tube 18 or the tube 19 which extend from opposite sides of the attachment. The tubes 18 and 19 are provided on opposite sides to facilitate connection to the hot air supply, and the tube which is not connected to the air supply may be plugged. The hot air supply may conveniently be obtained from the compressed air line usually existing in a factory, the air being suitably heated. The attachment may, if so desired, be fitted with an electrical or other convenient form of heater (not shown) for this purpose. The hot air admitted through either the tube 18 or 19 passes forwards through the hot air chamber 15 and is exhausted through an aperture in the front wall of the heating chamber 1. Likewise hot air passing through the hot air chamber 20 in the lower heater 2 also exhausts through an aperture in the front wall of the lower heater. In this case, the exhaust is shown at 21 but the exhaust aperture of the upper heater is connected with a short exhaust pipe 22, the end of which lies adjacent the end of an oil supply pipe 23 connected with a drip feed lubricator 24. Thus, the oil in the drip feed lubricator 24 is fed to the pipe 23 and atomised by the exhaust hot air passing out through the pipe 22, which exhaust blows the atomised oil on to the tool. The hot air coming from the exhaust also heats up the surface of the press tool.

The hot air passing through the hot air chambers 15 and 20 heats up the surfaces of the heaters 1 and 2 which form the boundary walls of the channel 5 through which the stock is fed, which thus heat up the stock as it is passed through the channel to the press tool.

An alternative manner of passing the hot air through the chambers 15 and 20 of the heaters 1 and 2 would be to cause it to flow in opposite directions therethrough, one component of the air flow in the direction of advancement of the stock and the other in the opposite direction. This may be accomplished by simply reversing the direction of air flow in the lower heater 2, making 21 the inlet and exhausting at the tube 18 or 19 of that heater.

The air then moving in the backward direction through heater 2 loses its heat to the stock in its progress so that the temperature of the entering stock rises steadily from the point of entry to the guide to the hot air inlet (now 21) of heater 2, and the temperature of the air falls from its inlet to the point of entry of the stock, where it is discharged at a relatively low temperature, thus reducing heat wastage, whilst the component of the air flow in the forward direction through heater 1 maintains the stock at its elevated temperature from the air inlet point to the point where the stock enters between the working faces of the tool, this component being discharged through pipe 22, as before, over the working faces of the tool and maintaining them at a temperature relatively close to the punching temperature. This forwardly directed component also serves to blow away swarf from the machining operation, from the finished part and from the working surfaces of the tool, whereby the abrasive action of such swarf on the working surfaces is avoided and the machined part freed from swarf without an additional cleaning operation. It may also be used for feeding lubricating oil to the tool as above described.

While the described construction of the heaters is preferred, it will be evident also that, if so desired, the hot air may be allowed to pass directly over one or both surfaces of the stock by suitably aperturing the surface 26 of one or both heaters 1 and 2, for instance as indicated by slots 25 in Fig. 2, so as to enable a direct contact between the hot air and stock to be established.

Although it is generally desirable to feed cold stock to the machine and provide sufficient heat in the guide to raise its temperature to the desired extent by the time the stock reaches the machining operation, it may be preferable in some cases to pre-heat the stock before feeding it to the guide and only provide sufficient heat in the guide either to maintain it at its pre-heated temperatures or to elevate it slightly if the stock has not been pre-heated fully to the temperature required for the machining operation.

I claim:

1. Apparatus for heating stock, upon which a machining operation is to be performed by means of a tool, to an elevated temperature, comprising a guide which is adapted to be attached to the machine performing the machining operation and through which the stock is fed to the machine, means for feeding hot air to heat said guide and the stock passing therethrough, and means for exhausting at least part of the hot air forwardly of the guide and in the direction in which the stock is advanced so that it blows on to the tool when the guide is attached to the machine.

2. Apparatus as claimed in claim 1, comprising means for feeding oil to the hot air which is exhausted forwardly of the guide.

3. Apparatus as claimed in claim 1, comprising a drip feed lubricator having an outlet orifice which is positioned in the path of the air which is exhausted forwardly of the guide.

4. Method of performing punching, shearing and kindred operations upon non-metallic stock of the class described which is characterized by its inability to withstand such operations without fracture unless heated, which method comprises feeding strip stock to the operational point at which such operation is to be performed, between guide surfaces respectively lying adjacent opposite surfaces of the stock, said guide surfaces respectively forming walls of hollow chambers, heating said guide surfaces by passing a hot air current through each of said chambers during passage of the stock so as to impart sufficient heat from said surfaces to the stock as to cause the stock to be at operational temperature upon arrival at said operational point.

5. Method of machining stock of the class described at an elevated temperature, which consists in passing a current of hot air over at least one of the surfaces of the stock while advancing it towards the position in the machine at which the machining operation is performed, said current being divided into two components which are caused to flow one in the direction of advancement of the stock and the other in the opposite direction.

6. Method of performing punching, shearing and kindred operations upon non-metallic stock of the class described which is characterized by its inability to withstand such operations without fracture unless heated, which method comprises feeding the stock to a tool by which such operation is to be performed, imparting heat to the stock from a hot air current while the stock is in transit to said tool such that the stock is at operational temperature upon arrival at said tool, and exhausting at least a part of said hot air current on to the tool for heating the tool to operational temperature during the feeding of the stock, whereby the stock is maintained at a substantially uniform temperature immediately before and during the performance of said operation thereon by said tool.

7. Method of performing punching, shearing and kindred operations upon non-metallic stock of the class described which is characterised by its inability to withstand such operations without fracture unless heated, which method comprises feeding the stock between the heat conducting guide surfaces to a tool by which such operation is to be performed, heating said surfaces externally by passing hot compressed air thereover whereby to impart heat to the stock from said surfaces while the stock is in transit therebetween such that the stock is at operational temperature upon arrival at said tool, and directing the exhaust hot air blast onto the tool for heating the tool to operational temperature during the feeding of the stock, whereby the stock is maintained at a substantially uniform temperature immediately before and during the performance of said operation thereon by said tool.

8. Method of machining stock of the class described at an elevated temperature, which consists in heating the stock, whilst it is being advanced towards the tool in the machine, by means of hot air, exhausting hot air on to the tool to elevate its temperature, and causing the exhausted hot air to blow oil onto the tool.

9. Apparatus for adapting a press for the performance of punching, shearing and kindred operations upon non-metallic stock of the class described which is characterised by its inability to withstand such operations without fracture unless heated, which apparatus comprises the combination of an enclosed guide adapted for passage of the stock therethrough and having at least one of its enclosing surfaces forming a wall of a chamber externally of the guide, means for attaching said guide to a press so that the forward end of the guide lies adjacent to the press tool, and means for passing hot compressed air through said chamber so as to heat said guide and thereby indirectly heat the stock as it is advanced through said guide.

10. Method of performing punching, shearing and kindred operations upon stock of the class described, comprising feeding strip stock between guide surfaces which lead to a tool by which such operation is to be performed, said guide surfaces respectively lying adjacent opposite surfaces of the stock and respectively forming walls of hollow chambers, heating said guide surfaces by passing a hot air current through each of said chambers during passage of the stock so as to impart sufficient heat from said surfaces to the stock as to cause the stock to be at operational temperature upon arrival at said tool, and directing the exhaust air current from at least one of said chambers on to said tool.

11. Method as defined in claim 10, in which the hot air current passed through one of said chambers is caused to flow in the direction of feed of the stock and is exhausted on to the tool, and the hot air current passed through the other of said chambers is caused to flow in the opposite direction.

12. Apparatus for heating stock of the class described upon which a punching, shearing or kindred operation is to be performed by means of a tool, said apparatus comprising the combination of a guide which is adapted for passage of the stock therethrough and which is adapted for mounting with an end thereof adjacent to said tool, said guide having at least one surface thereof adapted to lie adjacent the stock and forming a wall of a chamber externally of the guide, means for passing a hot air current through said chamber for heating the stock, and means for directing the exhaust air current from said chamber so that it blows on to said tool.

13. Apparatus for heating stock of the class described upon which a punching, shearing or kindred operation is to be performed by means of a tool, said apparatus comprising the combination of an enclosed guide which is adapted for passage of the stock therethrough and which is adapted for mounting with an end thereof adjacent to said tool, said guide having its enclosing surfaces constituting walls of chambers externally of the guide, means for feeding a hot air current to each of said chambers for heating the stock as it is advanced through said guide, and means for directing at least part of the exhaust air current from said chambers forwardly of the end of the guide adjacent to the tool so as to blow on to the tool.

LESLIE F. BENTLEY.